Dec. 16, 1941.  C. FISCHER  2,266,186

MIXING UTENSIL

Filed Nov. 29, 1940

INVENTOR.
Charles Fischer,
BY George D. Richards
ATTORNEY.

Patented Dec. 16, 1941

2,266,186

UNITED STATES PATENT OFFICE 2,266,186

MIXING UTENSIL

Charles Fischer, Newark, N. J.

Application November 29, 1940, Serial No. 367,712

3 Claims. (Cl. 259—19)

This invention relates to improvements in mixing utensils; and the invention has reference, more particularly, to a novel utensil comprising a covered mixing vessel having a manipulatable mixing agitator and a novel auxiliary ingredient feeding means detachably related thereto.

In the operation of mixing together the constituents of which some compositions are formed, it is frequently necessary, in order to obtain a desired proper blending thereof in the composition, that a given constituent or ingredient be added and worked into a preliminary mixture of the other ingredients. An example of a composition requiring such mixing method is an edible dressing known as mayonnaise, in the preparation of which the egg yolks, vinegar, lemon juice and other seasoning constituents are first mixed together, and then into such initial mixture is thereupon introduced olive or other edible oil, in such gradual manner that thorough emulsification of the oil is obtained with resultant proper blending thereof with the initial mixture, thereby to complete the ultimate composition.

Having the above in view, it is an object of this invention to provide in combination with a covered mixing vessel, having a reciprocatory and preferably rotatable mixing agitator, a novel auxiliary ingredient supply and feeding means adapted to be detachably mounted on the vessel cover for operative communication through the latter with the interior of said vessel.

Other objects of this invention, not at this time more particularly enumerated, will be understood from the following detailed description of the same.

Figure 1:
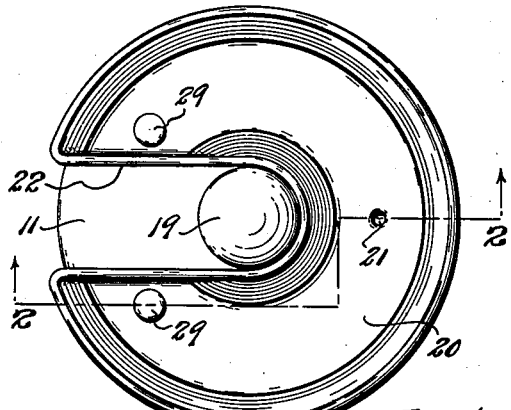
Figure 4:
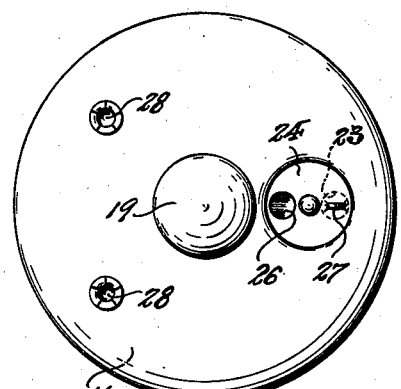
Figure 2:
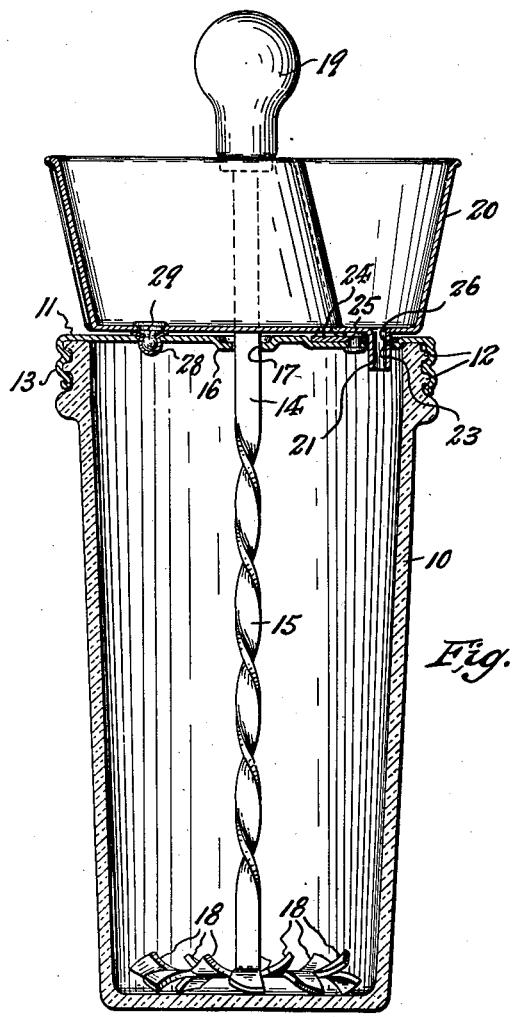
Figure 3:
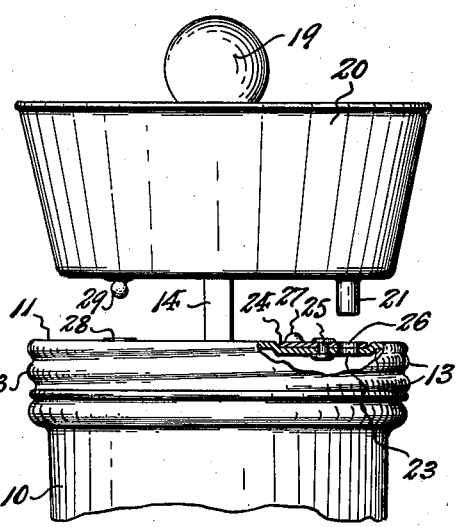

An illustrative embodiment of this invention is shown in the accompanying drawing, in which:

Fig. 1 is a top end view of the covered mixing vessel with the auxiliary ingredient supply and feeding means operatively mounted upon the vessel cover and in communication with the vessel interior; Fig. 2 is a longitudinal vertical sectional view thereof, taken on line 2—2 in Fig. 1; Fig. 3 is a fragmentary side elevation with parts in section, and showing the auxiliary ingredient supply and feeding means detached from the vessel cover in the process of removing the same from the vessel; and Fig. 4 is a top end view of the covered mixing vessel with the auxiliary ingredient supply and feeding means removed, and the cover port which serves the latter in closed condition.

Similar characters of reference are employed in the above described views, to indicate corresponding parts.

Referring to said drawing, the reference character 10 indicates the mixing vessel having an open top end. Said vessel may be made of any suitable material, but is preferably made of glass. Cooperative with the open top end of said vessel, so as to close the same, is a detachable cover member 11. The top end portion of the vessel and the skirt of the cover member 11 are provided with cooperative means for detachably securing the latter to the former. Such means may vary as to specific form; illustrative, however, of one practical form thereof, as shown in the drawings, are the male screw-threads 12 with which the top end portion of the vessel is provided and the cooperating female screw-threads 13 with which the skirt of the cover member 11 is provided.

The manipulatable mixing agitator with which the mixing vessel is provided comprises a perpendicular shaft 14 of rectangular cross section, intermediate the ends of which is formed a spiral section 15. The cover member 11 is provided, in a central location, with a bearing boss 16 having a bearing opening 17 conformable to the cross-sectional shape of said shaft. The shaft 14 extends downwardly through said bearing opening 17 into the interior of said mixing vessel. Affixed upon the lower interior end of said shaft 14 is a mixer or agitating device comprising a plurality of radial blades 18 suitably curved and pitched so as to agitate the material contained in the mixing vessel when moved therethrough. Connected to the upper exterior end of said shaft 14, in swiveling relation thereto, is a handle member 19 by which the shaft 14 may be axially reciprocated through the bearing opening 17 of the cover member bearing boss 16. When the shaft 14 is thus reciprocated its spiral section 15 is caused to traverse said bearing boss opening 17 whereby to impart rotary motion thereto and to the mixer or agitating device carried thereby. By such operation the blades 18 of the mixer or agitating device are not only moved up and down through the material contained in the mixing vessel but are simultaneously revolved in said material, thereby effecting a violent agitation of said material which is calculated to quickly and thoroughly intermingle the constituents thereof.

The novel auxiliary added ingredient feeding means which is provided for detachable connection with the cover member 11 of the mixing vessel, comprises a suitably shaped basin 20 having a suitably located tubular discharge spout 21 downwardly projecting from the bottom thereof. Although the basin 20 may be variously formed as to shape, it is preferable that its shape be such as to provide an outwardly open indenting portion 22 extending to the center thereof, whereby, when mounting or dismounting the same from the cover member 11, it may be moved laterally relative to and so as to straddle the exteriorly projecting portion of the shaft 14 of the mixer or agitating device. In order to admit the tubular discharge spout 21 of the basin 20 for communication with the interior of the mixing vessel 10, the cover member 11 is provided with a suitably located opening or port 23 through which said spout 21 may extend when the basin 20 is operatively mounted on the mixing vessel cover member 11. Associated with said opening or port 23 is means for closing the same when the basin 20 is removed and the mixing vessel is in use for mixing already contained ingredients of a composition under preparation. This means for closing the opening or port 23 is subject to more or less variation as to form, but illustrative of one practical form thereof as shown in the drawings, the same comprises a pivoted cover disc 24 rotatably pivoted to the cover member 11 by a pivoting rivet 25 or the like. Said cover disc 24 is provided with an opening 26, which, upon proper rotatable shift of said cover disc 24, may be brought into alignment and registration with the opening or port 23 (see Figs. 2 and 3), or may be shifted to move said opening 26 out of alignment with said opening or port 23 whereby the body of the cover disc closes said opening or port 23 (see Fig. 4). Upstanding from said cover disc 24 is a finger piece 27 by which it may be manipulated. Means are provided for releasably securing the basin against accidental shift or displacement from its operative applied relation to the cover member 11 when mounted thereon. Here again such securing means may be provided in various forms, but illustrative of one such form as shown in the drawing, the same comprises cooperative fastener elements with which the cover member 11 and the bottom of the basin 20 is provided. Preferably such fastener elements comprise a resilient female coupler or upwardly open snap socket member 28 which is mounted, e. g. on the cover member 11, and a male coupler member 29 which is affixed to the bottom of the basin 20 to project downwardly therefrom. If the basin 20 is of the laterally indented or bifurcate form above described and shown in the drawing, two sets of said fastener elements respectively associated with the respective horns or arms of the basin may be provided.

When use of the basin is desired, the cover disc 24 is moved to position for exposing the opening or port 23 of the cover member 11, whereupon the basin 20 is passed laterally into straddling relation to the exterior portion of the mixer or agitating device shaft 14, and so positioned that the spout 21 is aligned with said opening or port 23, and the male coupler members 29 are aligned with the female coupler members 28 (see Fig. 3). When thus positioned the basin 20 is thrust down onto the top of the cover member 11 so that its spout 21 enters through the opening or port 23 into communication with the mixing vessel interior, and so that the male coupler members 29 enter into and so as to be gripped by the female coupler members 28 (see Fig. 2). It will be apparent that, when the basin is thus mounted, it will be securely held against displacement or upset, and so that its content is guarded against spillage during use thereof in connection with mixing manipulation of the utensil.

When the basin 20 is mounted for use in the manner above described, the ingredient to be added to a preliminary mixture already contained in the mixing vessel 10 is deposited in said basin, wherefrom it will gradually flow or drip through the discharge spout 21 into the content of said mixing vessel 10 while the mixer or agitating device is being manipulated by the operator, and consequently the added ingredient thus introduced will be so delivered as to assure desired emulsification thereof or blending thereof with the initial mixture.

When the mixing vessel is desired to be used for ordinary mixing operations, requiring no subsequent introduction of an added ingredient, the basin 20 may be removed and laid aside, and the cover disc 24 positioned to close the opening or port 23 against outward spatter of the composition operated upon under such circumstances.

Having now described my invention, I claim:

1. In combination with a cover member of a mixing vessel, an auxiliary ingredient feeding means adapted to be detachably mounted on said cover member, said cover member having a port, a manipulatable closure for said port, said feeding means comprising a basin having a discharge spout dependent from its bottom adapted to be inserted through said port for communication with the mixing vessel interior, and means for releasably coupling said basin in secured assembled relation to the cover member.

2. In combination, a cover member for a mixing vessel having an agitator means reciprocable through said cover member, and an auxiliary ingredient feeding means detachably mountable on said cover member, said cover member having a port, a manipulatable closure for said port, said feeding means comprising a laterally indented basin adapted to straddle the exterior end portion of the mixing vessel agitator means, said basin having a discharge spout dependent from its bottom to be inserted through said cover member port for communication with the mixing vessel interior, and means for releasably coupling said basin in secured assembled relation to the cover member.

3. In combination, a cover member for a mixing vessel having an agitator means reciprocable through said cover member, and an auxiliary ingredient feeding means detachably mountable on said cover member, said cover member having a port, a manipulatable closure for said port, said feeding means comprising a laterally indented basin adapted to straddle the exterior end portion of the mixing vessel agitator means, said basin having a discharge spout dependent from its bottom to be inserted through said cover member port for communication with the mixing vessel interior, and means for releasably coupling said basin in secured assembled relation to the cover member, said latter means comprising cooperative male and female snap fastener elements with which the cover member and feeding means are respectively provided.

CHARLES FISCHER.